US012561548B2

(12) United States Patent
Faubert et al.

(10) Patent No.: US 12,561,548 B2
(45) Date of Patent: Feb. 24, 2026

(54) SYSTEM SIMULATING A DECISIONAL PROCESS IN A MAMMAL BRAIN ABOUT MOTIONS OF A VISUALLY OBSERVED BODY

(71) Applicants: UNIVERSITE DE MONTREAL, Montreal (CA); Essilor International, Charenton-le-Pont (FR)

(72) Inventors: Jocelyn Faubert, Montreal (CA); Khashayar Misaghian, Montreal (CA); Eduardo Lugo, Montreal (CA); Delphine Tranvouez-Bernardin, Saint-Laurent (CA)

(73) Assignees: UNIVERSITE DE MONTREAL, Montreal (CA); Essilor International, Charenton-le-Pont (FR)

( * ) Notice: Subject to any disclaimer, the term of this patent is extended or adjusted under 35 U.S.C. 154(b) by 1055 days.

(21) Appl. No.: 17/632,718

(22) PCT Filed: Aug. 3, 2020

(86) PCT No.: PCT/EP2020/071835

§ 371 (c)(1),
(2) Date: Feb. 3, 2022

(87) PCT Pub. No.: WO2021/023724

PCT Pub. Date: Feb. 11, 2021

(65) Prior Publication Data

US 2022/0284303 A1     Sep. 8, 2022

(30) Foreign Application Priority Data

Aug. 5, 2019    (EP) ..................................... 19190135

(51) Int. Cl.
| | |
|---|---|
| *G06N 3/006* | (2023.01) |
| *G06N 3/10* | (2006.01) |
| *G06V 40/20* | (2022.01) |

(52) U.S. Cl.
CPC ............... *G06N 3/006* (2013.01); *G06N 3/10* (2013.01); *G06V 40/23* (2022.01)

(58) Field of Classification Search
CPC ....... G06F 18/2414; G06N 3/088; G06N 7/01
See application file for complete search history.

(56) References Cited

U.S. PATENT DOCUMENTS

| | | | |
|---|---|---|---|
| 2008/0201286 A1* | 8/2008 | Hawkins | .................. G06N 7/01 706/46 |
| 2008/0225118 A1* | 9/2008 | Suzuki | .................. B60R 25/305 348/148 |

(Continued)

OTHER PUBLICATIONS

International Search Report issued Oct. 9, 2020 in PCT/EP2020/071835, 2 pages.

(Continued)

*Primary Examiner* — Akwasi M Sarpong
*Assistant Examiner* — Michael L Burleson
(74) *Attorney, Agent, or Firm* — Oblon, McClelland, Maier & Neustadt, L.L.P.

(57) ABSTRACT

A system simulating a decisional process in a mammal brain about characteristics of motions related to body gestures of a visually observed body through a simulated visual path is provided. The system includes an interface toward simulated neuronal structures, the interface at least converting luminous information of the observed body to an optic flow data stream conveying information related to the visually observed body and that can be processed in the simulated neuronal structures, the system being a feed-forward system and comprising hierarchically from the visual observation to the decision: the simulated visual path and its interface, a (Continued)

Figure 1:
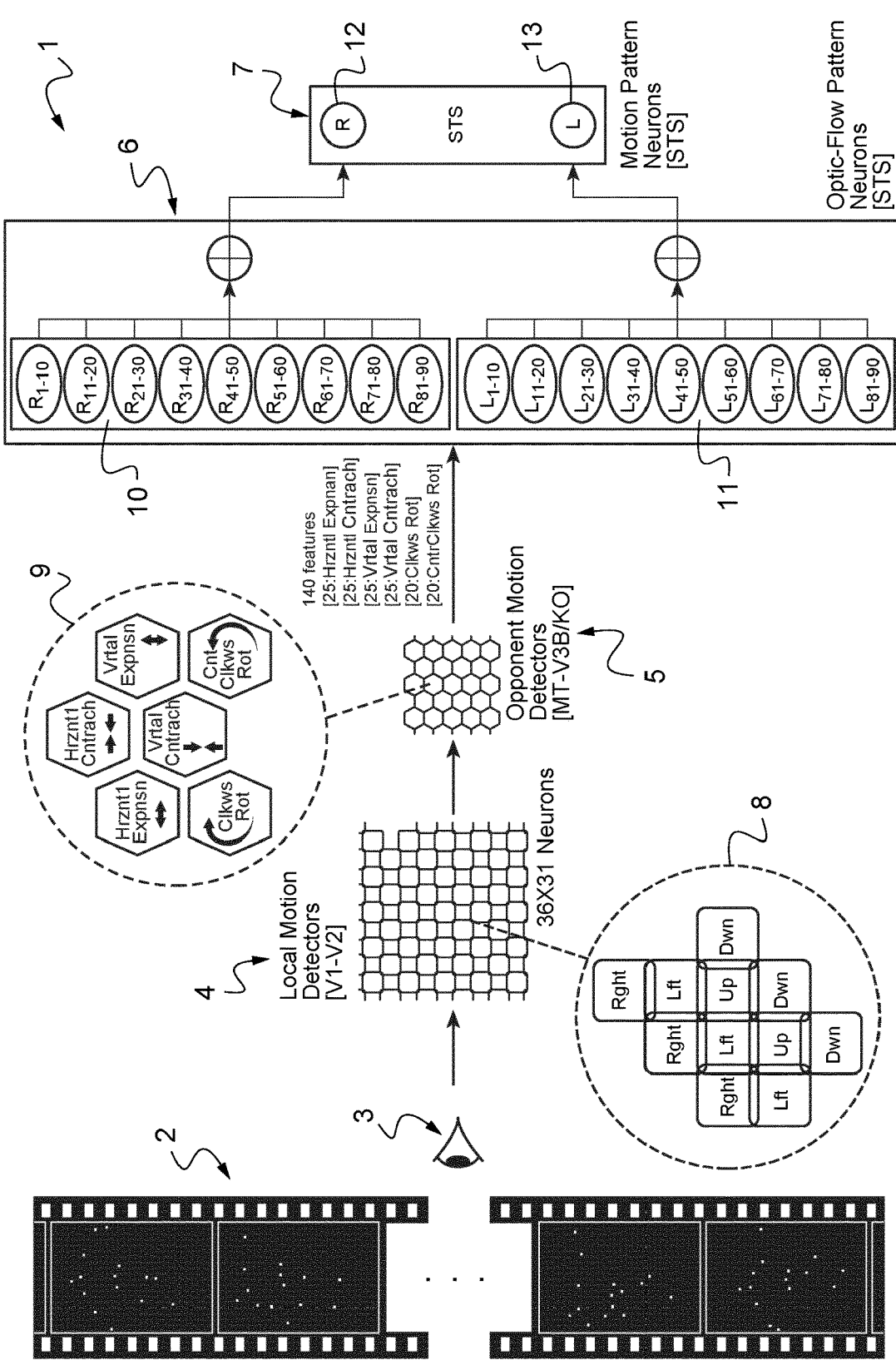

simulated local motion direction detection neuronal structure for the detection of motion directions with receptive fields, a simulated opponent motions detection neuronal structure, a simulated complex patterns detection neuronal structure, and a simulated motion pattern detection neuronal structure.

16 Claims, 3 Drawing Sheets

(56)                References Cited

U.S. PATENT DOCUMENTS

2015/0342723 A1 * 12/2015 Abramson ............... A61B 5/11
                                                                           623/6.64
2020/0288113 A1 *  9/2020 Seidl ........................ G06T 15/10

OTHER PUBLICATIONS

Yi-Zeng Hsieh et al., "Development of Home Intelligent Fall Detection IoT System Based on Feedback Optical Flow Convolutional Neural Network", IEEE Access, vol. 6, XP055674568, Jan. 1, 2018, pp. 6048-6057.
Murugadoss R. et al., "Universal Approximation of Nonlinear System Predictions in Sigmoid Activation Functions Using Artificial Neural Networks", 2014 IEEE International Conference On Computational Intelligence And Computing Research, IEEE XP033197382, Dec. 18, 2014, pp. 1-6.

Yikang Shen et al., "Ordered Neurons: Integrating Tree Structures into Recurrent Neural Networks", Arxiv.Org, Cornell University Library, 201 Olin Library Cornell University Ithaca, XP081428449, Oct. 22, 2018, pp. 1-14.
Antonino Casile et al., "Critical Features For The Recognition Of Biological Motion", Journal of Vision (2005) 5, pp. 348-360.
Paul Mineiro et al., "Analysis of Direction Selectivity Arising From Recurrent Cortical Interactions", Apr. 5, 1997, 18 pages.
Martin A. Giese et al., "Neural Mechanisms For The Recognition Of Biological Movements", Nature Reviews | Neuroscience, vol. 4 | Mar. 2003 | pp. 179-192.
Yun Shen, "Risk-sensitive Markov Decision Processes", (doctor rerum naturalium), Technischen Universität Berlin; 2015.
K. Misaghian et al., "Extended Descriptive Risk-averse Bayesian Model" a More Comprehensive Approach in Simulating Complex Biological Motion Perception, Faubert Lab, School of Optometry, University of Montreal, C. P. 6128, Montreal, Quebec, Canada, 16 pages.
K. Misaghian et al., "Descriptive Risk-averse Bayesian Decision-making" as a Model for Complex Biological Motion Perception In The Human Dorsal Pathway, Faubert Lab, School of Optometry, University of Montreal, C. P. 6128, Montreal, Quebec, Canada, 17 pages.
J.E. Lugo et al., "A Simple Dynamic Model That Accounts For Regulation Of Neuronal Polarity", J. Integr. Neurosci., vol. 17, Issue 4, Nov. 2018, pp. 323-330.
Snowden, R. J. et al., "Visual detection of motion"; Academic Press, 1994, 34 pages.
McCullock, J., "A Painless Q-Learning Tutorial.", retrieved from http://mnemstudio.org/path-finding-q-learning-tutorial.htm, 2012, 9 pages.

* cited by examiner

SYSTEM SIMULATING A DECISIONAL PROCESS IN A MAMMAL BRAIN ABOUT MOTIONS OF A VISUALLY OBSERVED BODY

TECHNICAL FIELD OF THE INVENTION

The invention relates to a detection and decision system simulating a decisional process in a mammal brain about motions of a visually observed body.

BACKGROUND INFORMATION AND PRIOR ART

Human's robust ability to recover information, e.g. identity or type of activity, about a moving living object from a sparse visual input is known as Biological Motion Perception. Biological motion perception has been the object of studies. Motion perception is an important function in living creatures and it is of use in many activities from the basic survival activities to the social life of mammals and notably human beings. Biological models of the neuronal structures and their relations involved in biological motion perception have been developed.

So far, it has been identified that the integration of local motion detection and dynamic form cues recognitions were involved in the biological motion perception function. More precisely, that function involves in the neuronal system, the activation of a "dorsal pathway" specialized in motion information processing, the activation of a "ventral pathway" specialised in form recognition and where the two outputs of those two pathways converge at the superior temporal sulcus (STS).

In the related technical field, it has been identified the following documents:

(1) YI-ZENG HSIEH ET AL: "Development of Home Intelligent Fall Detection IoT System Based on Feedback Optical Flow Convolutional Neural Network", IEEE ACCESS, vol. 6, 1 Jan. 2018 (2018-01-01), pages 6048-6057. That document discloses a CNN (Convolutional Neural Network) that is a standard network.

(2) MURUGADOSS R ET AL: "Universal approximation of nonlinear system predictions in sigmoid activation functions using artificial neural networks", 2014 IEEE INTERNATIONAL CONFERENCE ON COMPUTATIONAL INTELLIGENCE AND COMPUTING RESEARCH, IEEE, 18 Dec. 2014 (2014-12-18), pages 1-6. That document discloses a modification of a non-linear kernel on a known MLP (Multi-Layer Perception) that is fully connected.

(3) YIKANG SHEN ET AL: "Ordered Neurons: Integrating Tree Structures into Recurrent Neural Networks", ARXIV.Org, CORNELL UNIVERSITY LIBRARY, 201 OLIN LIBRARY CORNELL UNIVERSITY ITHACA, NY 14853. That document discloses a RNN (Recurrent Neural Network) of the type called LSTM (Long Short-Term Memory) and that is well known and that uses feedback connections.

However, their simulations in non-biological machines, notably computers, that try to mimic the involved biological structures do not provide very efficient and sufficiently close results to those provided by the real biological neuronal structures involved in biological motion perception in living creatures.

SUMMARY OF THE INVENTION

The inventor has developed a new descriptive risk adverse Bayesian simulation model with the addition of a disremembering function that gives much improved results for the motion perception, i.e. detection and decision, in simulated systems. Moreover, the addition of some specific movement detection in the system, notably clockwise and counter-clockwise rotation detection, has shown to further improve the results of the simulation.

The proposed system is intended to simulate the processing of the visual information that is done in the visual receptor that is an eye, possibly complemented with an ophthalmic apparatus, and in the neuronal structures downstream of the eyes and notably in some of the ones of the visual cortex within the brain of a human being, in order to reproduce the way a specific human subject decides about the content of the visual information he/she receives.

In the following description, the visual information that is processed and converted in the eye and the eventual ophthalmic apparatus is assumed to pertain to a visual path and its interface. Downstream the eye, the visual information that is processed in the neurons of the neuronal structures is assumed to pertain to an optic flow data stream and the related neuronal structures are generally referred in the technical field as pertaining to a visual cortex path.

Therefore, it is proposed a feedforward risk-sensitive Bayesian simulation model to mimic Biological Motion Perception. The proposed model is hierarchical and makes use of stored/memorized prototypical patterns related to the characteristics of motions the system has to decide about. Moreover, to further improve results, the decision-making neurons that are simulated are implemented with a dynamic mutually inhibitory network of neurons with a disremembering function.

It has to be noted that, in this document, the word "detector" is used as an equivalent to the word "neuron".

More precisely, the invention is a detection and decision system simulating a decisional process in a mammal brain about characteristics of motions related to body gestures of a visually observed body through a simulated visual path comprising an interface toward simulated neuronal structures, the simulated visual path and its interface at least converting luminous information of the observed body to an optic flow data stream conveying visual observation information related to the visually observed body and that can be processed in the simulated neuronal structures, the system being a feed-forward system and comprising hierarchically from the visual observation to the decision:

the simulated visual path and its interface, the simulated visual path and its interface being configured to simulate an eye and an eventual ophthalmic apparatus on said at least one eye, a simulated local motion direction detection neuronal structure for the detection of motion directions with receptive fields, receiving an optic flow data stream from the interface, a simulated opponent motions detection neuronal structure for the detection of opponent motions related to at least expansion and contraction, receiving an optic flow data stream from the simulated local motion direction detection neuronal structure, a simulated complex patterns detection neuronal structure for the detection of optic flow patterns globally in the whole visual observation and according to the evolution during time of the whole visual observation, receiving an optic flow data stream from the simulated opponent motions detection neuronal structure, the detectable patterns being prototypical patterns, and a simulated motion pattern detection neuronal structure for the detection of motion patterns, receiving an optic flow data stream from the simulated complex patterns detection neuronal structure, providing decisions about the characteristics of motions.

According to the invention, the neurons of the simulated motion pattern detection neuronal structure each comprises a disremembering capability that is a function of a delay and of the activity of said neuron.

The following additional means taken alone or in all possible technical combinations, are also considered:

the simulated motion pattern detection neuronal structure is a neuronal structure capable of memorization, the characteristics of motions related to body gestures are selected from at least one of: a direction of movement, a speed of movement, a location of movement, the visually observed body is a living body, notably an animal or a human body, the visually observed body is a machine, notably a robot, the visually observed body is a virtual body, the optic flow data stream that passes between the detection neuronal structures carries different type of information depending from which detection neuronal structure it comes from, the optic flow data stream can be a feature-vector when coming from the simulated opponent motions detection neuronal structure, the optic flow data stream is made of sequential frames, the prototypical patterns are learnt by the system in a preliminary learning stage, the prototypical patterns are preestablished in the system, the simulated opponent motions detection neuronal structure further detects opponent motions related to rotation, an internal noise of the system is further simulated in the system, a noise is added to the optic flow data stream outputted from the simulated complex patterns detection neuronal structure, the noise is added to the output of each and every neuron in the simulated complex patterns detection neuronal structure, a noise is added to the optic flow data stream inputted in the simulated motion pattern detection neuronal structure, the added noise has a Gaussian distribution, $\mathcal{N}$ (H$_i$(t), Δtδ$^2$), where δ$^2$ is the variance and H$_i$(t) is the ideal activity of the complex patterns detection neuron in the absence of the added internal noise, the simulated visual path and its interface is configured to simulate an eye and an eventual ophthalmic apparatus on said at least one eye, the eye and ophthalmic apparatus that are simulated have characteristics, the characteristics for the eye are notably correct vision, myopia, astigmatism . . . .

the characteristics for the ophthalmic apparatus are notably a lens power . . . .

the body is visually observed by a camera simulating an eye and producing an optic flow data stream, said optic flow data stream being further filtered by at least one characteristic function to simulate the characteristics of the eye and of the eventual ophthalmic apparatus, the camera simulating an eye comprises a set of receptive fields, the simulated local motion direction detection neuronal structure is configured to detect motion directions in a two dimensions space between receptive fields, the detectable motion directions being up, down and left, right, each receptive field has a reception field comprised between 0.5 deg to 1.5 deg, the reception field is preferably 0.9 deg, the simulated opponent motions detection neuronal structure is configured to detect expansions, contractions, clockwise rotations, and counter-clockwise rotations, in a two dimensions space, each neuron of the simulated opponent motions detection neuronal structure has an observation angle that is 3.5 deg, the simulated opponent motions detection neuronal structure is configured to detect expansions, contractions, clockwise rotations, and counter-clockwise rotations between receptive fields that are contiguous, the simulated opponent motions detection neuronal structure is configured to detect expansions, contractions, clockwise rotations, and counter-clockwise rotations between receptive fields that are not contiguous, the simulated complex patterns detection neuronal structure comprises a set of simulated neurons and is configured to detect prototypical patterns in a two dimensions space within a global observation angle of determined value, the simulated neurons of the simulated complex patterns detection neuronal structure being allocated to a number of groups of the set, the number of group corresponding to the number of possible decisions the system is capable of providing, each group comprising simulated neurons asymmetrically and laterally connected together within the group.

the number of groups is even, the number of groups is two for two possible decisions, the number of groups is odd with a minimum of three, the number of groups is three for three possible decisions, each group comprises a same number of simulated neurons, the group comprise different number of simulated neurons when at least one of the groups constitutes a one decision space, the simulated complex patterns detection neuronal structure comprises a set of simulated neurons and is configured to detect prototypical patterns in a two dimensions space with a global observation, the set of simulated neurons of the simulated complex patterns detection neuronal structure being allocated to two equal groups for two possible decisions about opposite directions of motion, each group of comprising simulated neurons asymmetrically and laterally connected together within the group, the two opposite directions of motion are left and right, the two opposite directions of motion are up and down, the set of simulated neurons of the simulated complex patterns detection neuronal structure is allocated to four groups for four detectable opposite two by two directions of motion, two left and right opposite directions and two up and down opposite directions, the global observation angle for the simulated complex patterns detection neuronal structure is 8 deg, the global observation angle for the simulated complex patterns detection neuronal structure is greater than 8 deg, and corresponds to the whole visual observation, the global observation angle for the simulated complex patterns detection neuronal structure corresponds to the whole visual observation,

the set of simulated neurons of the simulated complex patterns detection neuronal structure comprises eighteen simulated neurons, nine for each detectable opposite direction of motion, in the simulated complex patterns detection neuronal structure, an active neuron excites the neurons tuned to anticipate later patterns and inhibits the ones tuned to past patterns, in the simulated complex patterns detection neuronal structure, the dynamic of a neuron sensitive to an optic flow pattern corresponds to the following law:

$$\tau_{OFP}\dot{H}_i(t) = -H_i(t) + G_i(t) + \sum_m w(i-m)f(H_i(t))$$

where i is the $i^{th}$ frame of the optic flow data stream, the optic flow being risen from the i-1 to $i^{th}$ frame, Hi(t) is the activity of the neuron, $\tau_{OFP}=150$ ms, w(m) is a weight kernel, $f$(H) is a step threshold function, and Gi(t) is the instantaneous feed-forward input of the neuron, in the simulated complex patterns detection neuronal structure, the descriptive risk-averse Bayesian classifier that is implemented is based on an average risk minimizing method which uses different penalty levels for different errors, a classification error of the current frame into one of the later feature-vectors having less severity level compared to one related to an older template, a classification error happening when the feature-vector u that is outputted by the simulated opponent motions detection neuronal structure and which pertains to the space $R_i$ gets misclassified in class $\omega_k$ while i≠k and in case of classification error a loss term $\lambda_{ki}$ is assigned to said erroneous classification, and in case of correct classification a loss term $\lambda_{ki}$ of value 0 is assigned to said correct classification, and a loss matrix is formed that comprises elements $\lambda_{ki}$ constituting the penalty level for the classification in class $\omega_k$ when the true state is i, the state being the feature-vector received by the simulated complex patterns detection neuronal structure, in the case the set of simulated neurons of the simulated complex patterns detection neuronal structure comprises eighteen simulated neurons, nine for each detectable opposite direction of motion, eighteen classes are considered, nine classes for each of the two opposite directions of motion, the average risk is minimized according to the following formulae:

$$u \in R_i \text{ if } \sum_{k=1}^{18}\lambda_{ki}p(u\,|\,\omega_k)p(\omega_k) < \sum_{k=1}^{18}\lambda_{kj}p(u\,|\,\omega_k)p(\omega_k)$$

$$\lambda_{il} = 0, \forall\, j \neq i$$

where $\omega_i$, i=1 . . . 18 are the classes, $R_j$, j=1 . . . 18 makes up the regions/sub-spaces of the feature space, $R_i$, when it has the lowest weighted sum and classifies in class $\omega_i$, and where p(Pu|$\omega_k$) is the likelihood of the feature-vector given the class $\omega_k$, and p($\omega_k$) is the prior probability of the class $\omega_k$, the likelihood of feature-vectors of each space $R_i$ following a Gaussian distribution $\mathcal{N}$ ($\mu_i$, $\Sigma_i$), in which, μi is the mean vector, and Σi is the covariance matrix and the prior probabilities, p($\omega$k), are predefined for each class $\omega$k separately

6 where $\Sigma_{k=1}^{18}$p($\omega_k$)=1, in order that the detector tuned to class $\omega$i receives a positive non-zero feed-forward input, $G_i$(t), for each sequential frame whenever u(t) belongs to the feature space, $R_i$, and in order the neuron with the matching template inhibits the other neurons of the simulated motion pattern detection neuronal structure, the simulated motion pattern detection neuronal structure is configured as a mutually inhibited simulated neurons network in which simulated neurons with the highest excitatory input suppresses the activity of the other simulated neurons whose activities have not passed over their defined thresholds in a nonlinear and reciprocate operations, the mutually inhibited simulated neurons of the simulated motion pattern detection neuronal structure are simulated according to the following relations:

$$\tau\frac{dT}{dt} = -T + S(P_T(D))$$

$$\tau\frac{dD}{dt} = -D + S(P_D(D,T))$$

where T is the activity of whichever neuron who get excited first by the optic flow data stream received from the simulated complex patterns detection neuronal structure and D is the activity of the rest of the neurons of the network, $\square$ is a ti constant and S( ) is a modified Michaelis-Menten function (other similar functions like accumulative Gaussian or Weibull could also be used) according to:

$$S(P) = \begin{cases} \dfrac{MP^2}{\sigma^2 + P^2} & P \geq 0 \\ 0 & P < 0 \end{cases}$$

where M is the maximum information threshold for the excitatory-inhibitory activity and σ generally marks the information threshold point where the function S(P) hits half of its maximum, $P_T$ and $P_D$ are the information thresholds available to T-type and D-type neurons, respectively, with:

$$P_T(D)=E_T-kND$$

$$P_D(D,T)=E_D-k(N-1)D-kT$$

where IV is the number of neurons and the constant k is an inhibitory feedback gain, $E_T$ and $E_D$ represent the optic flow data stream received from the simulated complex patterns detection neuronal structure, when a mutually inhibited simulated neuron of the network is receiving a negative input in the optic flow data stream from the simulated complex patterns detection neuronal structure, then it is simulated according to the following relations:

$$\tau\frac{dT}{dt} = \begin{cases} -T & T \leq 0 \\ 0 & T > 0 \end{cases}$$

$$\tau\frac{dD}{dt} = \begin{cases} -D & D \leq 0 \\ 0 & D > 0 \end{cases}$$

the mutually inhibited simulated neurons of the simulated motion pattern detection neuronal structure have additional inputs through which the disremembering capability is executed, the additional inputs receiving data according to $Dis_T = u(t-\tau_a)*[T-S(P_T(D))-k_{Dis}T]$ for the primarily excited neuron and $Dis_D = u(t-\tau_a)*[D-S(P_D(D,T))-k_{Dis}D]$ for the other neurons, and where T is the activity of whichever neuron who get excited first by the optic flow data stream received from the simulated complex patterns detection neuronal structure and D is the activity of the rest of the neurons of the network, u( ) is the unit step function, $\tau_a$ is a time constant and S( ) is a modified Michaelis-Menten function, or any other function with same mathematical symmetry as Michaelis-Menten function e.g. accumulative Gaussian or Weibull, and $k_{Dis}$ a weighting coefficient, the system comprises at least one programmable computer implementing the neuronal structures, the at least one programmable computer comprises an input-output interface allowing to input parameters values modifying at least the delay related to the disremembering capability, the system further comprises a learning function implemented with a risk-sensitive Q-learning algorithm, the learning function is implemented in the simulated complex patterns detection neuronal structure.

DETAILED DESCRIPTION OF EXAMPLE(S)

Figure 2:
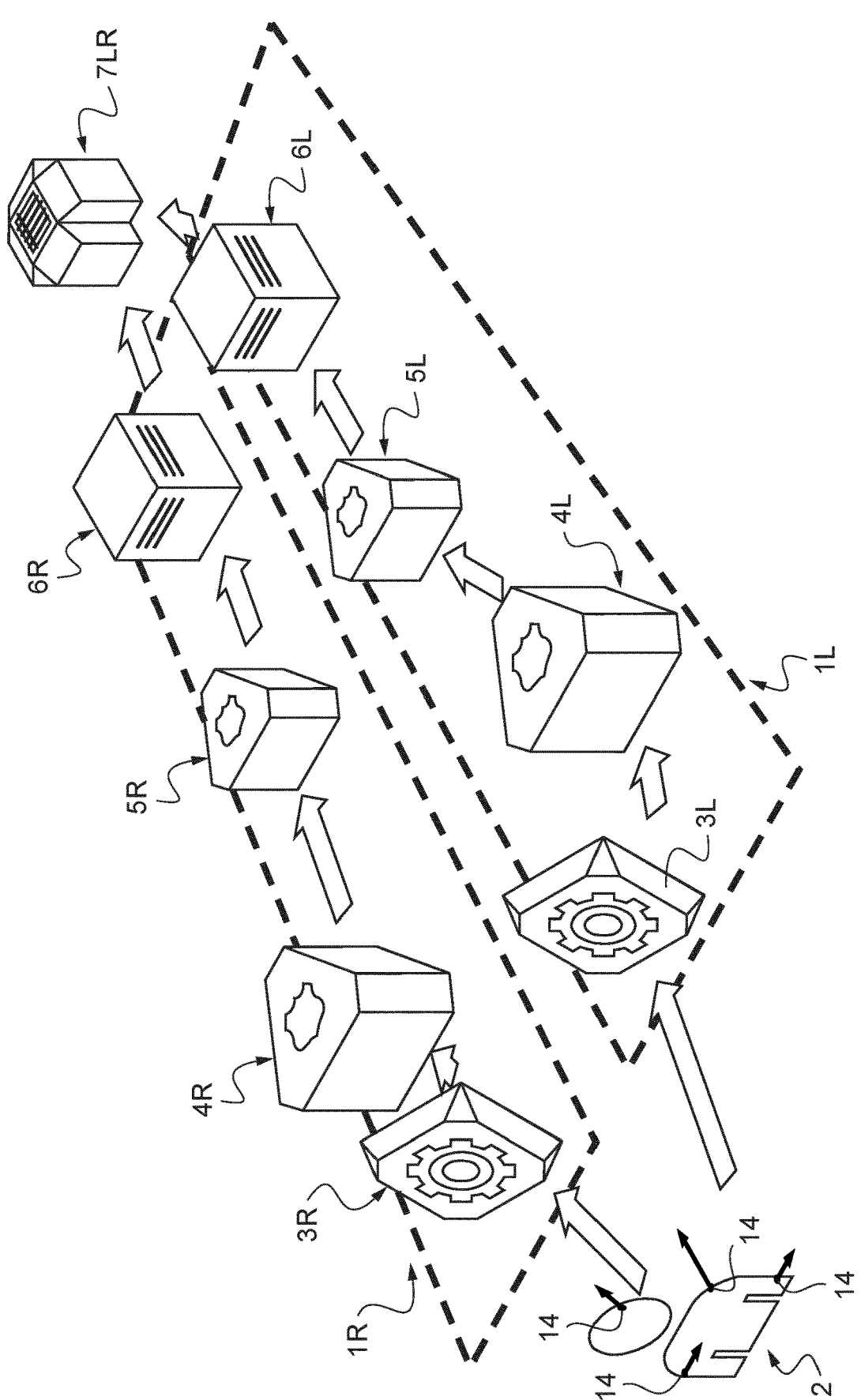
Figure 3:
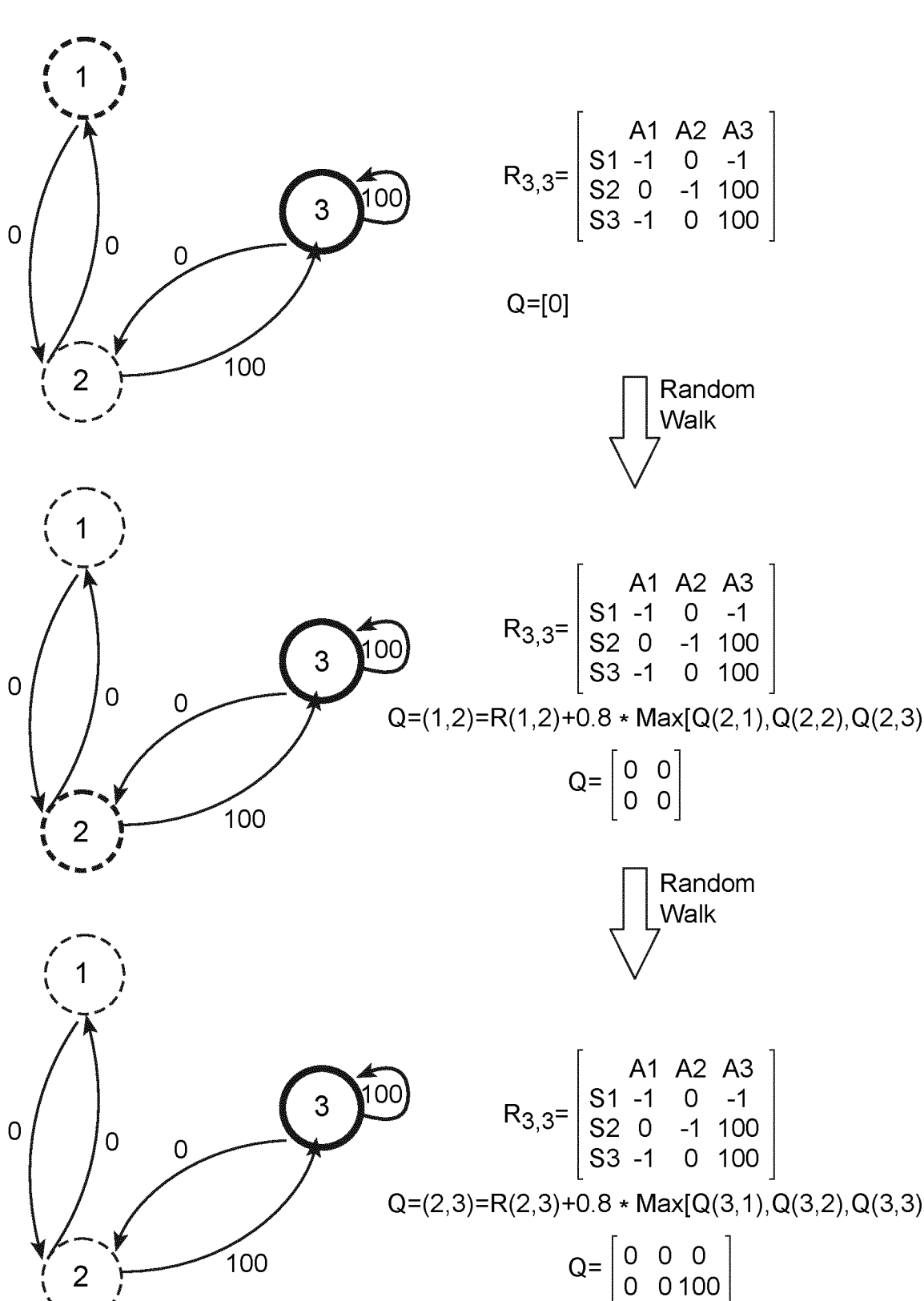

An exemplary embodiment of the present invention will now be described with reference to the accompanying figures of which:

FIG. 1 illustrates schematically the structure of the system according to the invention in the case of a monocular observation, FIG. 2 illustrates schematically the structure of the system according to the invention in the case of a binocular observation, and FIG. 3 is an example of learning steps of a Q-learning algorithm implemented in the third layer of the system.

The system of the invention will now be described with an exemplary implementation and then the application of the system to soccer game will be presented. More precisely, this exemplary implementation is a system capable of discerning the ball direction from a complex biological motion soccer shooting visual stimulus.

More generally, the system of the invention for simulating a decisional process is based on neuromimetics and it simulates the neuronal operations of a mammal brain and specifically the "dorsal pathway" specialized in motion information processing and which processes an "Optic flow" containing visual information. The decisions provided by the system are about characteristics of motions related to visually observed body gestures, such as, for example, the existence of motion, the direction of a motion. In that sense it behaves as a real biological motion detection and decision organ while being a simulated system.

Practically, with a system without internal adaptation capability, i.e. not able to adapts its neurons to detect and decide by itself about new characteristics, the characteristics that can be decided by the system are the ones the system is configured to detect and to decide about. In all cases, the result/output of the system is a decisional choice related to the characteristic. Note that the system of the invention has some learning capability in that sense the neuronal structures are operating according to functional parameters that can be learnt through a training procedure, notably to reproduce the way a specific human subject decides. In simpler operations, the system is provided directly with the functional parameter that have been predefined. We will see that those parameters can be, for example, a level of noise, a degree of inhibition between neurons, an intrinsic latency of a neuron.

In its principle, the simulated detection and system is a descriptive risk-averse Bayesian decision making system. It is based, firstly, on the assumption that the visual system that is copied by the simulated system stores prototypical patterns in the perception/cognition process, and secondly, on a hierarchical feedforward model comprising stacked layers, each layer having a specific detection function.

In addition, the final layer in the hierarchy, a motion pattern detectors layer, and that simulates decision-making neurons, is a dynamic model based on a mutually inhibitory network of neurons. However, this last model has been perfectioned with an additional function that is a disremembering function. It is the activities of these motion pattern detectors which constitute the decision response or more generally the behaviour of the biological motion simulated detection and decision system.

Therefore, the neuronal model used in the system of the invention is based on three main assumptions:

the simulated dorsal stream consists of hierarchies of neuronal detectors, i.e. neurons, configured to extract optic-flow features.

the model adopts a feed-forward architecture between layers of neuronal structures.

the system stores prototypical patterns and uses them for perception and recognition.

In relation to the FIGS. 1 and 2, the neuronal hierarchy of the dorsal stream that is simulated is a feed-forward architecture comprising the following layers of neurons in simulated neuronal structures operating in sequence/serially:

Local motion energy detectors 8,

Opponent motion detectors 9,

Complex patterns detectors arranged in two groups 10, 11, of detectors,

Motion pattern detectors 12, 13.

Those simulated neuronal structures are linked hierarchically, and information are passing between them from the output of a lower layer neuronal structure to the input of the next neuronal structure in said feed-forward architecture/hierarchy, in the form of an optic flow data stream.

Depending of the practical implementation for the computation of the simulated neurons of those neuronal structures, the optic flow data stream can be implemented in many ways from individual messages between specific entities simulating neurons to global message passing. In all cases, the general principle behind this is neuronal computation in which an output of a detector/neuron is computed as a function of its inputs to mimic the biological neuronal cell.

The neuronal structures and the neuronal hierarchy can be implemented in many ways from a totally virtual system that is fully computed, to the use of hardware elements simulating neurons and that are interconnected as for example an ASIC or reprogrammable gate array in which sets of gates are arranged to simulate neurons.

It has to be noted that, in the exemplified implementation, due to the use of generic computers that are digital systems, the implementation is based on sampled data, the evolutive visual data that is processed within the system being sampled into a sequence of still images or frames. However, in the case an analogic based system is used, and the visual data is continuously available, a non-sampled implementation may be possible.

The system is receiving a visual stimulus sequence or video that is typically a succession of frames or still images, the images being processed the one after the other in sequence and each layer is outputting an optic flow data stream that carry different type of information depending of the detection function of the layer. The visual stimulus sequence can be provided directly to the system or it can be the output of a device simulating an eye, notably of a digital video camera with some processing of the data provided by the camera. With such a simulated visual path and interface 3 in the system, it is then possible to simulate an eye in a perfect state or, instead, with some disease(s) or imperfection(s).

The system according to the invention has been challenged with a visual stimulus of high complexity, namely a soccer shooting on a ball, to detect the direction of the ball from the simulated subject's point of view, the simulated subject having a simulated decisional brain part based on the system according to the invention. Therefore, the exemplified implementation that is described has been built based on that goal/objective.

Local Motion Energy Detectors

The local Motion Energy Detectors are implemented in a simulated local motion direction detection neuronal structure 4, 4L, 4R, that makes a first, lower, layer in the neuronal hierarchy of the dorsal stream.

These local motion energy detectors are sensitive to different motion directions and have receptive fields smaller than the observation angle of the simulated opponent motions detection neuronal structure, typically with each receptive field having an angle of approximatively 0.9 deg. In the current exemplified implementation, the receptive fields are sensitive to four different directions: right and left, up and down between adjacent receptive fields and the corresponding detectors have been deployed in a 36×31 grid assembly.

In a more advanced implementation the detection can be extended to diagonal direction(s).

The neuronal structure uses two consecutive frames of the visual stimulus sequence to make a detection: the local motion energy detectors detects modifications between two consecutive frames and the optic flow data stream that is outputted by the simulated local motion direction detection neuronal structure carry information about the possible motion direction of each receptive field.

Max-pooling is implemented in the simulated local motion direction detection neuronal structure.

If needed, detailed explanation of the implementation of this simulated motion direction detection neuronal structure can be found in Casile A, Giese M A. "Critical features for the recognition of biological motion.", Journal of Vision. 2005; 5(4):6—and also in Smith, A. T., & Snowden, R. J. (1994), "Visual detection of motion"; Academic Press.

Opponent Motion Detectors

The opponent motion detectors 9 are implemented in a simulated opponent motions detection neuronal structure 5, 5L, 5R, that makes a second layer in the neuronal hierarchy of the dorsal stream.

These detectors are sensitive to opponent motions like expansions, contractions, and rotations.

For example, a neuron specialized in vertical contraction detection gets activated by the occurrence of such opposite motion in the two adjacent subfields located in its observation angle, those subfields are defined within the receptive fields corresponding to the local motion energy detectors.

In the exemplified implementation, the observation angle for each of the opponent motion detectors is approximatively 3.5 deg.

The opponent motion detector pools the responses of the local motion energy detectors, i.e. from the optic flow data stream that is outputted by the simulated local motion direction detection neuronal structure, of the same direction preference in one subfield.

In the case of vertical contraction that would be rightward motion in the left subfield while pooling the detectors responses from the adjacent subfield in the same fashion, only with the opposite preference (in the case of vertical contraction that would be leftward motion in the right subfield).

In the exemplified implementation, the detectors sensitive to opponent motions of vertical and horizontal expansion and contraction are 100 contraction and expansion detectors arranged in 5×5 assemblies, 25 detectors for horizontal expansion, 25 detectors for horizontal contraction, 25 detectors for vertical expansion and 25 detectors for vertical contraction and that are therefore able to produce detections of 100 features in relation to those opponent motions.

In addition to the horizontal and vertical contraction and expansion detections, the clockwise and counter-clockwise rotation detections that are able to produce detections of 20 features in relation to each orientation of rotation (clockwise or counter-clockwise), are implemented each with 20 detectors arranged in 5×4 assemblies. Therefore, the clockwise and counter-clockwise rotation detectors manage 20 receptive fields corresponding to the ones of the local motion energy detectors for each clockwise and counter-clockwise detection encompassing the 36×31 grid assembly of the simulated local motion direction detection neuronal structure. Each rotation receptive field is connected to 4 contiguous and overlapping subfields allowing the rotation detector to pick up the highest rotational activity also using the max-pooling strategy. Each subfield is related to 14×14 local motion energy detector of the simulated local motion direction detection neuronal structure making up a 5×4 receptive field arrangement for either of clockwise or counter-clockwise rotation in the simulated opponent motions detection neuronal structure.

The structure for the mechanism of the detection of rotation is now described. There are four subfields connected to each rotation detector (clockwise or counter-clockwise): the upper-left, the upper-right, the lower-left and the lower right subfields. Because the local motion energy detectors detect the four fundamental motion direction: right, left, up and down directions, the clockwise rotation could only be detected by the neuron under the two following conditions for the directions:

the upper-left subfield is up, the upper-right subfield is right, the lower-left subfield is left, and the lower right subfield is down, the upper-left subfield is right, the upper-right subfield is down, the lower-left subfield is up, and the lower right subfield is left.

The two conditions for the detection of counter-clockwise rotation can be easily deduced from the ones of the rotation.

The output of the simulated opponent motions detection neuronal structure is therefore able to detect 140 features in relation to the expansions, contractions and rotations corresponding to the opponent motions and that are outputted in the optic flow data stream sent to the next layer.

Complex Patterns Detectors

The complex patterns detectors are arranged in groups 10, 11 and are implemented in a simulated complex patterns detection neuronal structure 6, 6L, 6R, that makes a third layer in the neuronal hierarchy of the dorsal stream.

A pattern is a series over time of features that are detectable by the simulated opponent motions detection neuronal structure and that corresponds to a specific decision the system can reach. A pattern is a template that has been learned and it is one statistical frame. In the current exemplified implementation there are 18 statistical frames, two times nine for the two directions left and right and each neuron/detector of the simulated complex patterns detection neuronal structure 6, 6L, 6R is configured with one of these statistical frames. In the exemplified implementation, those statistical frames are pre-set in each of those neurons and there is no learning process. However, in a more advanced implementation, it is possible to implement and execute an initial learning phase. Therefore, in the exemplified implementation, those patterns are preestablished/pre-set according to possible decisions that the system is configured to compute regarding the visualised and processed motions related to body gestures.

The complex patterns detection neuronal structure is made up of neurons capable of detecting/discerning over time a succession of momentarily complex optic flow patterns. These neurons are then also responsive to the temporal order of the inputs they are receiving. It means that, if the order is not right, the risk (see the Bayesian risk assessment scheme explained further on) will be significantly higher so that, the neuron remains silent.

The complex patterns detectors are arranged as a network of laterally coupled neurons in which the asymmetrical connections allow that the active neuron at one moment excites the neurons tuned to the possible later optic flow pattern(s) and inhibits the rest of the detectors encrypting past/older optic flow patterns. If needed, the article of Mineiro, P. & Zipser, D. J. N. C. (1998), "Analysis of direction selectivity arising from recurrent cortical interactions." 10(2), 353-371, can be consulted.

In this manner, the assumed dynamic of the complex patterns detector sensitive to the ith frame, i.e. the optic flow that comes from the i-1 and ith frames of the sequence of frames, is as follow:

$$\tau_{OFP}\dot{H}_i(t) = -H_i(t) + G_i(t) + \sum_m w(i-m)f(H_i(t))$$

Where t is the time, m corresponds to the number of neurons of the third layer, $H_i(t)$ is the activity of the ith neuron, the $\tau_{OFP}$=150 ms is the time constant of the complex patterns detection dynamic, w(m) is an asymmetrical weight kernel, $f(H)$ is a step threshold function, and $G_i(t)$ is the instantaneous feed-forward input of the neuron and that is coming from the second layer 5, 5L, 5R. More precisely, the input of the simulated complex patterns detection neuronal structure 6, 6L, 6R that is coming from the simulated opponent motions detection neuronal structure 5, 5L, 5R goes through a Bayesian risk assessment scheme and the result constitutes the Gi(t). The inhibition part of the formulae is the summation term.

As the feed-forward input to each optic flow neuron in the third layer 6, 6L, 6R, is derived through the Bayesian risk assessment scheme, this represents the memory of the simulated complex patterns detection neuronal structure 6, 6L, 6R.

The dynamic of the complex patterns detector of the third layer 6, 6L, 6R, as expressed above is solved using Euler's method.

As mentioned previously, one of the fundamental assumptions about the model is the prototypical matching performed by the neurons. It is nothing but the result of a template matching process that constitutes the aforementioned feed-forward input. The template corresponds to information based on prior knowledge or previous learning of the possible patterns.

Attempts to develop a network of laterally coupled neurons for pattern detection have been described in the following documents: Casile, A., & Giese, M. A. (2005), "Critical features for the recognition of biological motion" in Journal of Vision, 5(4), 6-6, doi:10.1167/5.4.6 and, also, in Giese, M. A., & Poggio, T. (2003), "Neural mechanisms for the recognition of biological movements." in Nat Rev Neurosci, 4(3), 179-192.

To generate the instantaneous feedforward input $G_i(t)$, the exemplified implementation uses a smaller number of neurons and a different strategy compared to the developments described in the two documents listed just above. In those documents Radial basis functions are used for Gi(t). Moreover, the Radial basis function does not work at all with the kind of stimuli that is processed in the current system.

In the exemplified implementation, the feed-forward input $G_i(t)$ is deemed to be a product of a multiclass Bayesian classification scheme. The classical minimization of classification error is not used here but, instead, it has been chosen to use a method that minimizes the average risk, and which includes different significances for different types of errors. This has proved to be much more efficient. To be more precise, false classification of the current frame into one of the later feature-vectors must have less severity compared to one related to a past/older feature-vectors/template.

The logic behind it can be explained by the goalkeeper example; meaning that if a goalkeeper decides that the frame observed in a scene belongs to one of the future states of the sequence, the chance to save the ball is less compromised as opposed to classifying that scene into one of the past/earlier-encoding templates, keeping in mind that a template is a 140-element array so it is encoding a 300×400 pixel frame.

What has to be decided by the system in the exemplified implementation about the characteristics of motions is a side, left or right, of the ball direction as a result of the movements of a soccer player.

To simplify the process, an angle of deviation of the shoot relative to the center of the visually observed scene in which the body of the soccer player is seen by the system is considered. Still to simplify, nine successive temporal periods for each stimulus sequence (i.e. penalty shooting sequence) have been considered for the definition of the patterns as concern their evolution over time.

In the exemplified implementation, each stimulus sequence/video with a duration length of 4.5 s is sampled and comprised of 90 frames and the simulated complex patterns detection neuronal structure receives a feature-vector of 140 elements at its inputs every two consecutive frames. The sampling is based on time points with a period of 500 msec. The simulated complex patterns detection neuronal structure comprises eighteen detectors/neurons, with a group 10 (FIG. 1) of nine detectors for right-ward direction and a group 11 (FIG. 1) of nine detectors for left-ward direction, and each detector is sensitive to ten sequential frames out of the 90 frames of the stimulus. The template stored in each simulated neuron is a statistical pattern that represents all those 10 frames and also those ten frames in 20 different degrees, on top of that, there is also the parallel connection between the neurons that governs the neurons to maintain the sequence.

More generally, the number of neurons in the complex patterns detection neuronal structure is a function of the number of frames each neuron is dedicated to process (10 frames in the exemplified implementation) and of the length of the stimulus (90 frames in the exemplified implementation) and of the number of possible decisions (2 in the exemplified implementation). Of course, in other implementations, those values can be changed.

For example, in the exemplified implementation, neuron $H_1^{left}$ is selective for frames 1 to 10 of the left side shooting and neuron $H_6^{right}$ is selective for the frames 41 to 50 of the right-side shooting. Each of the 18 neurons incorporates an internal generative model, $(u|\omega_k)$, $k=1, \ldots, 18$, assumed to be of the Gaussian form, $\mathcal{N}(\mu k, \Sigma k)$. The mean, $\mu k$, and covariance matrix, $\Sigma k$, of each template is computed using feature vectors derived from 10 frames of multiple stimuli with different degrees of deviation. Each template and, hence, each the statistical frame, is therefore a Gaussian function with a mean vector and covariance matrix.

For instance, neuron $H_6^{right}$ is trained using feature vectors from frames 61 to 70 of the shoots with 7° to 20° degrees of deviation to the right-hand side of the observer. Concisely, neuron $H_6^{right}$ is supposedly selective for frames 61 to 70 regardless of the deviation of the shooting.

Those parameters result in a classification problem with eighteen classes, nine classes for the right-ward ball and nine classes for the left-ward ball. This also means that the simulated complex patterns detection neuronal structure comprises 18 detectors/neurons, 9 for right-ward direction and 9 for left-ward direction.

Each class represents one specific period of the stimulus sequence. Each period corresponds to 10 successive frames in a stimulus sequence with 90 frames. For example, the 1st class associated with right-ward ball means we are in the first period of the stimulus sequence and this corresponds to the first ten frames. The 3rd class associated with a left-ward ball is the good detection when the stimulus sequence reaches somewhere between frames 31 to 40 and with such a ball direction.

Therefore, the related classification problem is an eighteen classes problem, $\omega_i, i=1, \ldots, 18$, where $R_j, j=1, \ldots, 18$ makes up the regions/sub-spaces of the feature space $R_i$. Of course, this can be applied to any number of classes (neurons) of the third layer.

An error happens when the feature-vector u which pertains to the space $R_i$ gets misclassified in class $\omega_k$ while $i \neq k$, and so, a loss term $\lambda_{ki}$ will be assigned to this incorrect decision. In this manner, a loss matrix can be formed that its element $\lambda_{ki}$ constitutes the penalty for action k (here: classification in class $\omega_k$) when the true state is i (the feature-vector fed to the third layer).

It can be shown that the average risk is minimized when:

$$u \in R_i \text{ if } \Sigma_{k=1}^{18} \lambda_{ki}(u|\omega_k)p(\omega_k) < \Sigma_{k=1}^{18} \lambda_{kj}p(u|\omega_k)p(\omega_k)$$
$$\lambda_{ii} 0, \forall j \neq i$$

which indicates, that u originates from the space $R_i$ when it has the lowest weighted sum and classifies in class $\omega_i$. In that in equation, $p(u|\omega_k)$ is the likelihood of the feature-vector given the class $\omega_k$, and $p(\omega_k)$ is the prior probability of the class $\omega_k$. In the implemented model, it is assumed that the likelihood of feature-vectors of each space $R_i$ follows a Gaussian distribution $(\mu_i, \Sigma_i)$, in which, $\mu_i$ is the mean vector, and $\Sigma_i$ is the covariance matrix. Moreover, the priors, $p(\omega_k)$, are predefined for each class $\omega_k$ separately and $\Sigma_{k=1}^{18} p(\omega_k) = 1$.

In this manner, the detector/neuron tuned to class $\omega_i$ receives a positive non-zero feed-forward input, $G_i(t)$, at each time step/frame whenever u(t) belongs to the feature space, $R_i$.

This can be described at the cellular level the following way: when one input matches the pre-set template of one neuron of indicia i, all other neurons with different classes see that as a sizeable weighted quantity added to their risk sum while the loss term $\lambda_{ii}=0$ relieves the matching neuron of indicia i from adding that large signal to its risk sum. In other words, the neuron with the matching template inhibits the responses of other neurons.

Motion Pattern Detectors

The motion pattern detectors 12, 13 are implemented in a simulated motion pattern detection neuronal structure 7, 7LR, that makes a fourth layer in the neuronal hierarchy of the dorsal stream and that provides the final decision about characteristic(s) of the motion.

Therefore, discrimination of complete biological motion pattern occurs in motion pattern detectors/neurons which makes up the fourth and highest layer of the model.

In the exemplified implementation, the complete biological actions are limited to two possible decisions: to differentiate between the leftward shoot and rightward shoot stimuli and only two simulated neurons are implemented. The two neurons are arranged according to a robust mutual Inhibition model with the ability to adapt and disremember. This is a nonlinear differential system and it has been resolved using a 4th order Runge-Kutta method.

More generally, the sum of the activities of the complex patterns detectors that are implemented in the simulated complex patterns detection neuronal structure and which belong to one particular action corresponding to one of the possible decisions, serves as an input to the motion pattern detector associated with that very action.

In the case the number of activity decisions the system has to decide is not two but, for example three, then three neurons are implemented at the fourth layer and, initially, the third layer neurons are trained with the three activities that are to be decided by the system.

As explained at the beginning, this is a non-linear, excitatory, and inhibitory network of neurons that is implemented to simulate the motion pattern detectors of the fourth layer.

For that purpose, a non-linear, excitatory, and inhibitory network is used to simulate these motion pattern detectors. The operation of this network is known as mutual or global inhibition, the detector with the highest excitatory input suppresses the activity of those whose activities have not passed their thresholds in a nonlinear and reciprocative fashion.

In addition, a disremembering function is added in the operation of the network of neurons of the fourth layer. Thanks to this disremembering function, the reaction time that is present in decisions taken by real biological brain can be simulated more precisely with the system.

In the current example, the disremembering function has only been implemented in the last two decision neurons of the fourth layer.

The disremembering function is based on the neuronal adaptation that refers to the decrease in the responsiveness of neurons exposed to a constant stimulus over time. For example, in the visual system, visual perception of an image or a motion gradually diminishes or vanishes if there is no fixational eye movement. The motion pattern detectors neurons as decision-making neurons are no exceptions and should not stay activated perpetually, the disremembering function serving to implement the ephemeral nature of neuronal activation in the system.

In the exemplified implementation, it has to be noted that the disremembering function is implemented in the fourth layer, in the simulated motion pattern detection neuronal structure, in order to simplify the implementation of the system.

The mutual inhibition model has the dynamic below and explains the response of decision-making neurons:

$$\tau dT/dt = -T + S(P_T(D))$$

$$\tau dD/dt = -D + S(P_D(D,T))$$

where, T is the activity of primarily excited neuron and D represents the activity of other neurons in the $4^{th}$ layer 7, 7LR, $\tau$ is a time constant and S(P) is a modified Michaelis-Menten function which has been proven advantageous in excitatory-inhibitory network model design. In other implementations, another function than the Michaelis-Menten function may be used and, for example, a behaving function like accumulative Gaussian. In such other implementations, any other function for example, accumulative Gaussian or Weibull function with same mathematical symmetry as Michaelis-Menten function can be used.

Also, $P_T$ and $P_D$ are the information thresholds available to T-type and D-type neurons, respectively: when information thresholds are negative, and as a result, the neurons lateral connections within the fourth layer 7, 7LR are off, the robust mutual inhibition model sets the negative output of the neurons into zero. More precisely:

$$P_T(D) = E_T - k_{inh} ND$$

$$P(D,T) = E_D - k_{inh}(N-1)D - kT$$

where N is the number of neurons and the constant $k_{inh}$ is the inhibitory feedback gain. Also, $E_T$ and $E_D$ represent the external inputs generated from the previous hierarchy of layers, the third one.

The modified Michaelis-Menten function is:

$$S(P) = \begin{cases} \dfrac{MP^2}{\sigma^2 + P^2} & P \geq 0 \\ 0 & P < 0 \end{cases}$$

where M is the maximum information threshold for the excitatory-inhibitory activity and $\sigma$ sets the point where S(P) reaches its half maximum value.

The number of equations to solve depends on how many decision-making neurons are involved in the process. For instance, for decision-making agents to pick one choice out of N choices, this would need to solve one equation for P(D) and N−1 equations for $P_D(D, T)$.

In the exemplified implementation, the decision is between left and right, N=2, and therefore the fourth layer is implemented with two simulated neurons.

The disremembering function is implemented in the fourth layer with the following modification of the mutual inhibition model that introduces time dependent terms as an input to the dynamic of both T and D neurons:

$$Dis_T = (t - \tau_a) * [T - S(P_T(D)) - k_{Dis}T]$$

$$Dis_D = (t - \tau_a) * [D - S(P_D(D,T)) - k_{Dis}D]$$

where, u( ) is the unit step function, $\tau_a$ marks the time point when adaptation/disremembering starts and $k_{Dis}$ is a weighting coefficient. At time $\tau_a$, the disremembering inputs to the differential equations get switched on and the dynamic of each neuron reduces to a simple exponential decline, driving the neuron out of excitation state.

Preferably, the mutual inhibition model that is implemented, is also modified in that, to reduce the level of sensitivity, the fourth layer neglects the negative changes instead of attenuating exponentially the activity of the neuron according to a linear first order dynamic. More precisely, when neurons are disconnected as a result of negative information thresholds, neurons activities will be as follows:

$$\tau \frac{dT}{dt} = \begin{cases} -T & T \leq 0 \\ 0 & T > 0 \end{cases}$$

$$\tau \frac{dD}{dt} = \begin{cases} -D & D \leq 0 \\ 0 & D > 0 \end{cases}$$

Noise

The system with the four layers described so far can be used as such. But it may be preferable to add some level of noise to better simulate the uncertainty in the decision-making process.

In this exemplary implementation, in order to simplify the implementation of the system, the noise is received at the input of the fourth layer within the optic flow data stream. However, it also possible to introduce noise in one or more of the other layers of the hierarchical system. Moreover, a very low level of noise can also have beneficial effects in the functioning of the neuronal networks.

Therefore, to simulate uncertainty in the decision-making process, it is assumed that the output of each complex patterns detector ($3^{rd}$ layer) is drawn from a Gaussian distribution, $\mathcal{N}(H_i(t), \Delta t \delta^2)$, where $H_i(t)$ is the mean ideal activity of the complex patterns detector in the absence of the added internal noise of variance, $\delta^2$.

Simulated Visual Path and Interface

The system for simulating a decisional process is applied to visually observed/perceived data and it may be advantageous to also simulate the organ responsible for the vision that is the eye. The eye as simulated by the simulated visual path and its interface 3 (FIG. 1) 3R, 3L (FIG. 2) converts luminous information of an observed scene 2 (symbolized as a sequence of frames in FIG. 1) to an optic flow data stream conveying information related to the visually observed scene and that can be processed through the four layers of neuronal structures. The simulated eye is therefore also an interface between the observed scene and the optic flow data stream. This is why the simulated eye is referred as a simulated visual path and interface.

The simulated eye can be implemented to simulate a regular eye, a perfect eye or an eye having some deficiencies. Moreover, it may be simulated with an additional ophthalmic apparatus (e.g. lens or google).

The simulated visual path and its interface can be a video camera, a combination of computation means and a visual sensor such as a video camera or be purely implemented as computation means. The computation means allow pre-processing of the optic flow data stream before it is sent and processed to the first layer of detection. For example, the pre-processing can be a blurring of the scene, a deformation of the scene to simulate myopia or other deficiency, the deformation of the scene to simulate the action of an ophthalmic apparatus (e.g. lens or google).

In the current application, the scene comprises an observable body that is moving to create body gestures that is analysed by the system. If the body is preferably a mammal body and particularly a human body, the invention can be applied to any observable element that can have parts that move related to other parts, not necessarily a living creature.

Training and Tests

The simulation has been implemented in a computer using in Matlab® and the data and statistical analyses have been performed with RStudio® framework.

For the test of the system, a simplified body which observation is limited to a number of bright dots has been used. This is the reason why the sequence of frames of the observed scene 2 of FIG. 1 comprises bright dots that are moving from frame to frame.

However, the system could be applied to scenes in which a body has a regular appearance, but this would necessitate more complexity to the layers and notably more neurons in $3^{rd}$ 6, 6L, 6R and $4^{th}$ 7, 7LR layers.

More precisely, to test the system, dot light soccer penalty shooting videos recorded from real human soccer players were used. The ball had no dot on it (the ball or any representative of the ball is not present in the stimuli). The result of the penalty shooting to decide is the direction of the ball.

The dot light soccer penalty shooting videos were previously used to collect psychophysical data from real human observers, i.e. subjects, notably as concern the decision about the direction, left or right, of the ball. Beside the decision, the psychophysical data that were collected are notably the classical threshold and slope used to describe a sensory task. Those psychophysical data were used in the test of the system and for cross-validation between real humans and the system.

The stimulus from the video comprised 15 dots representing the head and the human body's major joints: shoulders, hips, elbows, wrists, knees, and ankles. This is schematised on FIG. 2 where the body of the soccer player in the observed scene 2 comprises dots 14 (the movements of the dots being symbolised with arrows). Each stimulus is comprised of 90 frames with a duration length of 4.5 seconds. By rotating the original stimulus around the Z-axis, it was possible to create the stimuli for leftward and rightward point-light soccer shootings with different angles.

In the psychophysical study, 35 human subjects have been exposed to the stimuli with deviations of 2°, 4°, 8° and 15° angles either towards the left-hand side or right-hand side of the viewer/subject.

For training and cross-validation of the system, the utilized data is comprised of all shooting angles within the range of 1° to 20°. This range is the angular range in a penalty shooting from the goal's point of view.

A k-fold, k=5, cross-validation procedure has been used to cross-validate the system.

More precisely, the model has been trained in two stages: firstly, cross validation on 1 to 20 degrees to ascertain that the algorithm is validated, and secondly, training of the model on degrees 7 to 20 which makes more sense in a natural context. More precisely, this second stage was done for the 2°, 4°, 8° and 15° angles to recreate the psychophysical study conditions.

In the psychophysical study, a forced choice paradigm task to decide the direction of the ball, left or right, by only relying on the biological motion signal has been designed. Each of the 35 human subjects was exposed to the total of 1080 randomized stimulus sequences of left and right shooting with deviations of 2°, 4°, 8° and 15° angles (120 times for each angle at each side). Accordingly, for each human subject, a psychophysical function to relate human behaviour to the angular deviation was determined.

In the system, to be able reproduce the performances of the real humans/subjects, three variables of the system were adjusted to mimic the behaviours of the 35 subjects from the psychophysical study. Those variables are thus functional parameters of the system and its neuronal structures.

Just like the psychophysical study, for each angle and side, the system has been exposed to the same stimulus 120 times in order to generate an error percentage quantity. Additionally, this has been repeated 30 times, and same psychophysical parameters as the subjects' ones have been assessed on the system from the simulated results to be able to compare the subjects and the system.

The four variables for tuning the system to the behaviour of each of the 35 subjects were:

The standard deviation of the internal noise, $\delta$ received at the input of the of the motion pattern detectors that are implemented in the simulated motion pattern detection neuronal structure.

The time constant, $\tau$ of the motion pattern detectors that are implemented in the simulated motion pattern detection neuronal structure.

The inhibitory feedback gain, $k_{inh}$ of the motion pattern detectors that are implemented in the simulated motion pattern detection neuronal structure.

The disremembering that is embedded in the $\tau_a$ parameter.

After training, the system performed very well comparably to previously known systems without disremembering capability and without rotation detection. The 5-fold cross-validation of the system resulted in 87.5% average success rate with the lowest success rate of 62.5% when tested by the first fold and 100% success rate when tested by the two last folds.

The system performance demonstrated remarkable robustness in the presence of a wide range of imposed internal noise, $\delta$, even if the increase in internal noise level resulted in a higher angular threshold, flatter slope and faster reaction time or overall worse performance of the system.

Besides noise being a prominent tuning parameter of the system, the degree of inhibition occurring between the two decision making neurons, represented by k, along with their intrinsic latency, represented by $\tau$, prove to be critical factors to bring the model into the different behaviours of the subjects.

For a wide range of the variables k, $\tau$ and $\delta$, the system has been run with a constant value $\tau_a$=1.22 sec and the angular thresholds, slopes and reaction times have been calculated accordingly. Of course, it is also possible to adjusts the value of $\tau$.

The addition of the rotation detection leads to a better performance in all computed configurations of the system with no exception, meaning a lower angular threshold and steeper slope but with no significant change in reaction time. This addition of the rotation detection even allowed the simulation of one of the subjects that was not possible previously, without rotation detection.

The contribution of the variables to the system's decision-making behaviour gained from the tests is now presented.

Increase in neurons' dynamic time constant, $\tau$ always results in better performance, meaning lower angular thresholds and steeper slopes.

An increase in the inhibitory gain, k shows different traits depending of the value of k, but it always leads to higher reaction time. At first, the increase of inhibition gain, k leads to deterioration of performance with a higher threshold and a flatter slope, but, this changes after k passes the value of 8 with an amelioration. However, this phenomenon seems less obvious for δ=0.030. In that noise level, the angular thresholds are not decreasing but just increasing with a lower rate. Finally, one must notice the slopes taking on a new trend becoming steeper which only means reaching to highest accuracy in lower angular deviations.

The betterment of the performance does not come by, free of cost. Analysing the activity of the motion pattern detectors shows it takes far more time for the winning detector/ neuron to reach the highest point of its activity when the inhibitory gain, k, is very large and this could be interpreted as leading to longer processing time. Therefore, in the system, the increase in the processing time appearing in large inhibitory gains and which affects the excitation/ inhibition ratio of the motion pattern neuronal system, could be construed as noticeable compliance of the present system with current findings in humans.

Subject's Results Versus Simulation Results

By adjusting the variables mentioned above: internal noise δ, mutual inhibition time constant τ and inhibitory gain k, it has been possible with the system to simulate the behaviour, i.e. their psychophysical function, of the 35 subjects with very good accuracy.

Correlation analysis shows a significant positive correlation between experimental and simulated angular threshold values, with the Spearman correlation coefficient rs=0.991, p-value=7.08E−31 (p<0.001) and another significant positive correlation between simulated and experimental slope values with Spearman correlation coefficient rs=0.963, p-value=2.70E−20 (p<0.001).

The exemplified implementation of the system uses fixed prototypical patterns, parameters, and priors, i.e. the prior probability ($\omega_k$) of the class $\omega_k$, to perceive and make decisions and this approach is a statistical risk-sensitive framework with a pre-tuned risk matrix. A more comprehensive model of the system in which the previous elements would be adaptable, notably the variables for tuning the system, could benefit from online learning and adaptation capacities.

In the realm of machine learning that can be applied to the current model, reinforcement learning can be implemented, wherein an agent learns to do specific actions that result in the highest reward is a subset of unsupervised learning, whose method of learning conforms to cause and effect. Q-learning as a form of reinforcement learning has shown promise in modelling reward-based human decision making and dopaminergically mediated reward prediction mechanisms.

For such an implementation of Q-learning, it is useful to define some concepts:

Environment: The plot within which the problem happens,

Agent: an autonomous actor that performs actions under certain assumptions,

Action: any possible performance that the agent could perform (like a link in a graph), State: the situation with which the agent could preside (like a node in a graph), Reward: the immediate gain that the environment awards the agent for its last action (like a weight assigned to each link), Policy: the strategy that dictates the next action by the agent based on the current state, Value: expected long-term gain of any state using a specific policy, and Action value: also called Q-value, is similar to value and only depends on the action too, and means, the expected long-term gain from taking a particular action in a particular state using specific policy.

If we assume, in a certain environment, one of the states is the goal, the objective of the agent with a clean slate is to arrive at that goal state when put in the mentioned environment. To assign one state as the goal could be achieved by associating a reward value or weight to each possible action.

For example, if there is one state from which the agent could go to the goal state in the next step that action has a reward value of 100, but whatever action that does not lead to the goal state has zero reward value. One could view that the reward is a matrix that relates the states to actions with elements of the matrix being the reward values. In that reward matrix, besides the values zeroes and 100s, when some action does not exist, we can merely assign a negative reward value to it. The reward matrix is initialized to a zero matrix at the beginning of learning.

Now, the action value matrix, Q, with an unknown number of elements and also initialized to a zero matrix with a single value of zero (the matrix will expand when new states are discovered during the learning), represents the brain of our agent who knows nothing at the beginning of learning.

A simple transition formula is the used:

$$Q(\text{state, action})=\text{Reward}(\text{state, action})+\gamma*\text{Max}(Q(\text{next state, all actions}))$$

Each element of the action value matrix, Q, would be calculated by adding a learning term to the corresponding value in the reward matrix. The updating term is the maximum value from the Q for all possible actions in the next state multiplied by a learning rate, γ.

By initializing the agent in a random state and the action value matrix, Q, to a zero matrix, the algorithm could start. At each step the agent randomly chooses to go to one of the possible states, then we calculate the value of the element in the action value matrix, Q, by adding the corresponding element of the reward matrix element to the maximum value of all possible actions in the next state in the action value matrix, Q, multiplied by an updating factor. What has just been explained characterizes one iteration of the learning process and iterations are made toward a convergence. The corresponding learning process is illustrated FIG. 3 with a simplified example of learning steps of a three states system with an absorbing goal.

Upon convergence, one can assume that the agent knows the most optimal path to the goal, meaning from whichever initial state, the path that sums up the highest value is the path to take as proposed by McCullock, J. (2012) in "A Painless Q-Learning Tutorial.", retrieved from http://mne-mstudio.org/path-finding-q-learning-tutorial.htm.

In the framework of our biological motion perception model, the agent would be the third layer of the complex patterns detectors that are implemented in the simulated complex patterns detection neuronal structure 6, 6L, 6R and that recognizes the different stages of the motion. The state space is the stimuli that covers all kinds of body movement, moved through the first and second layers, and the action space is the classification of the observations into their corresponding temporal stages. At every run, we set up a new environment with a new initial state. At each step, for a given sequence in the stimulus, we get an action from the agent based on which the environment returns reward and a new state.

This set of state, action, reward, and next states shapes up the Q-value according to the mentioned updating rule. A stabilized converged Q-value is the policy that enables the agent to make the best classification given observation for maximum reward. To attain accurate Q values, one could resort to deep neural networks. Hence, the term deep Q-learning.

To model systems with unknown transition probabilities like human behaviour it is possible to use a risk-sensitive Q-learning algorithm that implements the sequential decision making. A utility function is chosen to provide a risk-sensitive framework for decision making with noisy rewards as proposed in Shen, Y (2015) "Risk-sensitive Markov Decision Processes." (doctor rerum naturalium), Technischen Universität Berlin.

The system, as a functioning simulator, can have multiple usages. The system can be applied in optic ophthalmic prescription or design because it allows inter-individual adaptation of optics on a simulated system. Based on the neuromimetics model, conception and innovation of new optical designs or new coatings can be improved in taking into account individual adaptation capacity, notably through the value of $\tau_a$ with the corresponding layer modelling the excitation/inhibition neuron reaction. Adaptation capacity of the system can be varied depending on individual characteristics of the future wearer: such as age, ametropia, expertise, etc. It is also possible with the system of the invention that mimics the human brain to study and model the impact of ophthalmic lens distortions on human decision-making processes.

Therefore, the producers of ophthalmic lenses would be able to evaluate and estimate the impact of their designs on real-life situations in advance. Example of such situations is to determine if the person coming from the front goes to the left or right of the observer in order to avoid a collision or detection of more subtle movements. This application could be accomplished by inserting the lens design model between the biological motion stimulus and the simulation model. By implementing the process before the production, the lens manufacturer could spare a large part of the expenses and time that it put into the assessment stage.

For example, the impact of an optical distortion on the biological motion perception has been tested. The observed scene of the soccer shoot, the dot light display in the current instance, has been deformed by barrel aberrations of 2.3 dioptres. The psychophysical functions have been simulated and computed in the system. This resulted in a change in the thresholds and slopes of the psychophysical function of the simulated subject/system. For example, one simulated subject having a threshold of 9.3° without distortion was altered to 17.9° with the distortion and its slope was altered from 0.12 to 0.06. For another simulated subject, the threshold was altered from 10.7° to 42.3° and the slope from 0.11 to 0.013. It worth reminding that better is the accuracy to detect the orientation of a biological motion, higher is the slopes and conversely.

In another applications, the system can be applied in robotic vision for rapid recognition of human action gestures. For instance, in robots that help the older population or other populations in an assessment of human based actions. It can also be applied to surveillance systems for determining specific actions or in sports for performance monitoring.

The system according to the invention can be implemented in many other ways and for example according to the following possibilities:

In the exemplified implementation of the system, the opponent motion detectors of the simulated opponent motions detection neuronal structure only receive data from adjoining receptive fields of the local motion energy detectors. In a more advanced system it is possible to pool the data from two distant receptive fields to be able to detect global or at least larger relative motions in a moving scene.

In the exemplified implementation of the system, both the first and second layers have been simulated as noise free but, as seen above, it could be possible to add noise to one or two of those layers.

The implementation used for the test comprised a system as represented FIG. 1, with only one simulated visual path and interface and hierarchical structure of layers in a monocular application. The system can be extended to binocular implementation as represented FIG. 2 in which two sub-systems 1R, 1L, comprised each of a simulated visual path and interface 3R, 3L, a simulated local motion direction detection neuronal structure 4R, 4L, a simulated opponent motions detection neuronal structure 5R, 5L, and a simulated complex patterns detection neuronal structure 6R, 6L, are arranged in parallel and their outputs (from the two simulated complex patterns detection neuronal structures of the two sub-systems 1R, 1L) are sent to a common simulated motion pattern detection neuronal structure 7LR that provides decisions. Due to the two different point of view of the two simulated visual paths and interfaces toward the same scene, and to the parallel layers, it is possible to provide additional decisions related to characteristics of motions available with a binocular vision.

The invention claimed is:

1. A computer-based system simulating a mammal brain decisional process related to characteristics of body gesture motions of a visually observed body through a simulated visual path, the system comprising:

neuronal circuitry comprising hardware-simulated neurons, and the simulated visual path comprising an interface to the neuronal circuitry, the simulated visual path and the interface being configured to convert luminous information of the visually observed body to an optic flow data stream conveying visual observation information related to the visually observed body, the optic flow data stream being processed in the neuronal circuitry, the system being a feed-forward system and comprising hierarchically, from the visual observation to a decision, the following layers:

the simulated visual path and the interface, which includes hardware simulating an eye and an eventual ophthalmic apparatus on said eye, simulated local motion direction detection neuronal circuitry detecting motion directions with receptive fields, and receiving a first optic flow data stream from the interface, simulated opponent motions detection neuronal circuitry detecting opponent motions related to at least expansion and contraction, and receiving a second optic flow data stream from the simulated local motion direction detection neuronal circuitry, simulated complex patterns detection neuronal circuitry detecting optic flow patterns globally on a whole visual observation and according to evolution during a time of the whole visual observation, and receiving a third optic flow data stream from the simulated opponent motions detection neuronal circuitry, the detectable patterns being prototypical patterns, and simulated motion pattern detection neuronal circuitry detecting motion patterns, receiving a fourth optic flow data stream from the simulated complex patterns detection neuronal circuitry, and providing decisions about characteristics of motions, wherein neurons of the simulated motion pattern detection neuronal circuitry implement a disremembering capability that is a function of a delay and of an activity of said simulated neuron, wherein the system further comprises an input-output interface allowing input of parameters values modifying at least the delay related to the disremembering capability.

2. The computer-based system according to claim 1 wherein the simulated opponent motions detection neuronal circuitry further detects opponent motions related to rotation.

3. The computer-based system according to claim 1, wherein an internal noise of the system is further simulated in the system, and wherein a noise is added to the fourth optic flow data stream outputted from the simulated complex patterns detection neuronal circuitry.

4. The computer-based system according to claim 1, wherein the simulated local motion direction detection neuronal circuitry further detects motion directions in a two-dimensional space between receptive fields, the detectable motion directions being up, down and left, right.

5. The computer-based system according to claim 2, wherein the simulated opponent motions detection neuronal circuitry further detects expansions, contractions, clockwise rotations, and counter-clockwise rotations, in a two-dimensional space.

6. The computer-based system according to claim 1, wherein the simulated complex patterns detection neuronal circuitry comprises a set of the hardware-simulated neurons detecting prototypical patterns in a two-dimensional space within a global observation angle having a determined value, the simulated neurons of the simulated complex patterns detection neuronal circuitry being allocated to a number of groups of the set of the hardware-simulated neurons, the number of groups corresponding to a number of possible decisions the system is configured to provide, each group comprising simulated neurons asymmetrically and laterally connected together within the group.

7. The computer-based system according to claim 1, wherein the simulated motion pattern detection neuronal circuitry is further configured as a mutually inhibited simulated neurons network in which simulated neurons with a highest excitatory input suppress the activity of the other simulated neurons whose activities have not passed over corresponding defined thresholds in nonlinear and reciprocate operations.

8. The computer-based system according to claim 7, wherein the mutually inhibited simulated neurons of the simulated motion pattern detection neuronal structure have additional inputs through which the disremembering capability is executed, the additional inputs receiving data according to $\text{Dis}_T = u(t-\tau_a)*[T-S(P_T(D))-K_{Dis}T]$ for a primarily excited simulated neuron and $\text{Dis}_D = u(t-\tau_a)*[D-S(P_D(D,T))-K_{Dis}D]$ for the other simulated neurons, and where T is the activity of whichever simulated neuron gets excited first by the fourth optic flow data stream received from the simulated complex patterns detection neuronal structure and D is the activity of the rest of the neurons of the network, u( ) is the unit step function, $\tau_a$ is a time constant, S( ) is a modified Michaelis-Menten function, or any other function with a same mathematical symmetry as Michaelis-Menten function, and $k_{Dis}$ a weighting coefficient.

9. The computer-based system according to claim 1, further comprising a learning device implemented with a risk-sensitive Q-learning algorithm.

10. The computer-based system according to claim 9, wherein the learning device is implemented in the simulated complex patterns detection neuronal circuitry.

11. The computer-based system according to claim 1, wherein the simulated opponent motions detection neuronal circuitry further detects opponent motions related to rotation, wherein the simulated opponent motions detection neuronal circuitry further detects expansions, contractions, clockwise rotations, and counter-clockwise rotations, in a two-dimensional space, and wherein the simulated local motion direction detection neuronal circuitry further detects motion directions in a two-dimensional space between receptive fields, the detectable motion directions being up, down and left, right.

12. The computer-based system according to claim 11, wherein the simulated complex patterns detection neuronal circuitry comprises a set of the hardware-simulated neurons and is configured to detect prototypical patterns in a two-dimensional space within a global observation angle having a determined value, the simulated neurons of the simulated complex patterns detection neuronal circuitry being allocated to a number of groups of the set of the hardware-simulated neurons, the number of groups corresponding to a number of possible decisions the system is configured to provide, each group comprising simulated neurons asymmetrically and laterally connected together within the group.

13. The computer-based system according to claim 12, wherein the simulated motion pattern detection neuronal circuitry is further configured as a mutually inhibited simulated neurons network in which simulated neurons with a highest excitatory input suppress activity of the other simulated neurons whose activities have not passed over corresponding defined thresholds in nonlinear and reciprocate operations.

14. The computer-based system according to claim 13, wherein the mutually inhibited simulated neurons of the simulated motion pattern detection neuronal circuitry have additional inputs through which the disremembering capability is executed, the additional inputs receiving data according to $\text{Dis}_T = u(t-\tau_a)*[T-S(P_T(D))-k_{Dis}T]$ for a primarily excited neuron and $\text{Dis}_D = u(t-\tau_a)*[D-S(P_D(D,T))-k_{Dis}D]$ for the other simulated neurons, and where T is the activity of whichever simulated neuron who get excited first by the fourth optic flow data stream received from the simulated complex patterns detection neuronal structure and D is the activity of the rest of the simulated neurons of the network, u( ) is the unit step function, $\tau_a$ is a time constant, S( ) is a modified Michaelis-Menten function, or any other function with a same mathematical symmetry as Michaelis-Menten function, and $K_{Dis}$ a weighting coefficient.

15. The computer-based system according to claim 14, wherein an internal noise of the system is further simulated in the system, and wherein a noise is added to the fourth optic flow data stream outputted from the simulated complex patterns detection neuronal structure.

16. The computer-based system according to claim 14, further comprising a learning device implemented with a risk-sensitive Q-learning algorithm.

* * * * *